Feb. 4, 1941.   A. E. DOUGLASS   2,230,831
METHOD OF TREATING CEMENT RAW MATERIAL
Filed April 3, 1940   3 Sheets-Sheet 1

INVENTOR
Alfred E Douglass
BY
ATTORNEYS

Feb. 4, 1941.   A. E. DOUGLASS   2,230,831
METHOD OF TREATING CEMENT RAW MATERIAL
Filed April 3, 1940   3 Sheets-Sheet 2

INVENTOR
*Alfred E Douglass*
BY
ATTORNEYS

Feb. 4, 1941.    A. E. DOUGLASS    2,230,831
METHOD OF TREATING CEMENT RAW MATERIAL
Filed April 3, 1940    3 Sheets-Sheet 3

INVENTOR
Alfred E. Douglass
BY
ATTORNEYS

UNITED STATES PATENT OFFICE 2,230,831

METHOD OF TREATING CEMENT RAW MATERIAL

Alfred E. Douglass, Catasauqua, Pa.

Application April 3, 1940, Serial No. 327,607

12 Claims. (Cl. 263—53)

This invention relates to the manufacture of cement and more particularly to the drying and heating of cement raw material mixtures prepared under a wet process method, prior to burning in rotary kilns.

In the manufacture of cement, by what is commonly known as the wet process, the finely ground raw material is usually delivered to the drying zone of a rotary kiln, or to a preliminary dryer, in the form of a slurry or suspension in water, in which the water content is ordinarily about thirty-five percent. In a few cement mills, as a preliminary step, filters or centrifuges are employed to reduce the water content. The filter or centrifuge cake is a plastic mass, impervious to the flow of hot gases, retaining usually at least eighteen percent of water. While either in the form of slurry or the wet plastic masses resulting from partial drying, the material is difficult to handle in order to contact all portions thereof with the heated gases used for drying. Partial drying of slurry by the application of heat first results in similar plastic masses and later in the formation of large lumps both more or less impervious to the heated gases. In the burning of raw materials in rotary kilns, large quantities of heated gases are available for drying purposes and, in order to transfer efficiently the heat from these gases to the raw material, as large an area of surface contact as possible should be provided. Various methods have been suggested for this purpose but have proven faulty due primarily to the lack of proper contact of the heated gases with the material as it is dried and to excessive dust losses, especially of fine dried material particles, in the exit gases resulting from the action of the agitating mechanisms which tend to suspend the particles in the gas stream.

It is among the purposes of the present invention to provide a method whereby cement raw material in the form of slurry, or in other forms containing substantial proportions of water, may be sufficiently dried with the hot waste gases from rotary kilns used for the burning of cement clinker, and to economize in fuel consumption, to increase the capacity of the kiln, or both. In most of the existing cement mills, the kilns are relatively short and, accordingly, uneconomical in the consumption of fuel, the exhaust gases being necessarily of very high temperature, in order that the reactions in burning may be completed to produce properly burned clinker. In those plants where cement is now manufactured by the wet process, a considerable proportion of the length of the kiln must be utilized for removing the moisture and raising the raw material to an elevated temperature, the sections of the kiln so used commonly being called the "drying zone" and "pre-calcining zone." The effect of the present invention, when used with this type of plant, is to deliver the raw material to the kiln in a dry and preheated condition and thereby increase the length of the kiln available for further preliminary heating, calcining and burning. The invention finds its greatest utility in the conversion of dry process plants to the wet process as it permits the use of existing kilns, which in such plants are ordinarily too short, at least for practical operation, with wet raw materials. By the use of the present invention, it is possible to make such a conversion without substantially modifying the operation of the kiln and with fuel economy substantially equivalent to dry-process burning.

In some cases it has been found, particularly when the moisture content of the slurry is high, that there is not enough heat available in the exit gases of the kiln to dry the slurry completely. In such cases, the slurry may be dewatered partially by means of a filter or centrifuge, but usually the degree of drying is sufficient for practical purposes, as the small amount of residual moisture in the material delivered to the kiln is quickly driven off and does not materially diminish the capacity or efficiency of the kiln.

In general, the invention comprises passing the wet slurry under conditions of continuous agitation over supporting plates heated by exit gases from the kiln, the plates forming at least one passageway in the upper portion of an enclosed chamber, and at the same time passing heated gases through the passageway to increase the degree of evaporation and to carry away the moisture. The total length of the passageway, or passageways, is preferably sufficient to dry the material discharging therefrom to a degree such that it will not flow freely. The partially dried material which is then in the form of cakes or large lumps is delivered to a further drying and heating compartment where it is formed into a bed inclining downwardly in the direction of its travel, with the partially dried material from the passageways being continuously supplied at its upper end. The bed of material is intermittently and regularly advanced while under conditions of continuous agitation and during this treatment heated waste gases from the kiln are caused to flow over the bed and heat the same by surface contact. The gases flowing over the bed of material in the heating compartment are directed to the passageways where they both heat the material supporting plates and contact the oncoming material, as previously stated. By the intermittent and regular advancement of the bed, the cakes or large lumps delivered from the passageways, are broken up due to the continuous agitation as they undergo the drying and heating and the bed is automatically graded with the smaller particles at the bottom and the larger particles at the top. This has a great advantage in that the larger particles which carry the most moisture and require the most heat for a thorough drying and heating come in contact with the hottest gases and are caused to break up further, so that when the material has traveled the full length of the bed it is in a dry heated condition and the lumps are of a size particularly adapted for burning in the kiln. It has been found in the use of this process that the efficiency of plant operation is increased by a reduction of the amount of fuel required to burn the clinker, especially is this true in plants now operating under the wet process where, by reducing the temperature of the exhaust gases to a low degree, valuable heat units are regained. The invention has a further advantage in that the raw or partially burned particles entrained in the exhaust gases are filtered out by contact with the wet slurry, thereby making the use of separators in the stack flue unnecessary.

It is contemplated in a more specific operation of the method, of utility for materials which tend to agglomerate in the form of small lumps with very little free material, to pass a portion of the heated gases through the bed of material in the heating compartment in a multiplicity of gas streams thereby obtaining a more uniform distribution of the heated gases and greater surface contact with the particles.

Various apparatuses may be used to carry out the several steps of the process and for purpose of illustration an apparatus found to be especially adapted for the purpose is shown in the accompanying drawings in which—

Figure 1:
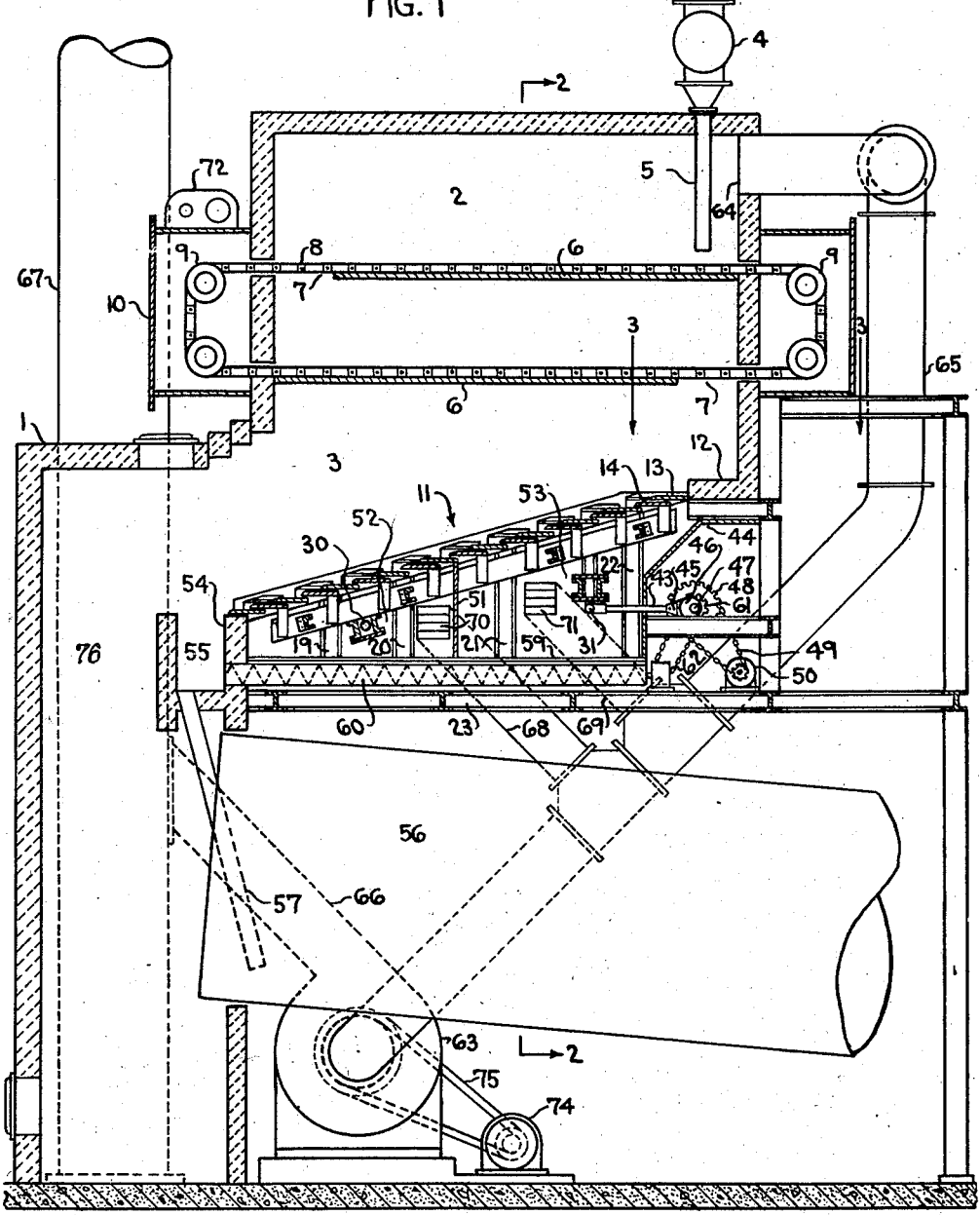
Fig. 1 is a sectional elevation of the device for drying and heating cement slurry.
Figure 3:
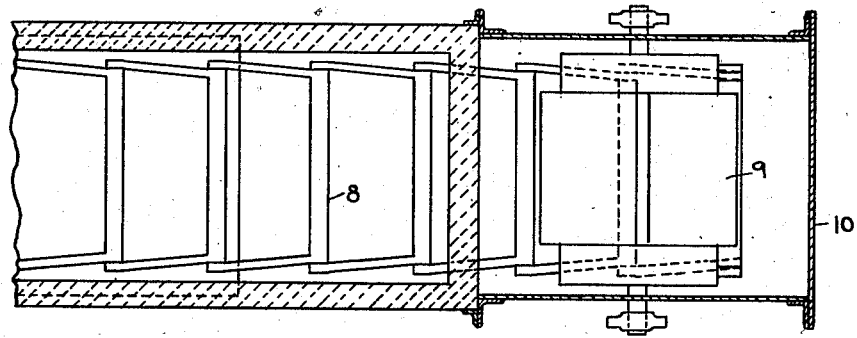
Fig. 3 is a cross-sectional plan view of a portion of the drying chamber taken on line 3—3 of Fig. 1.
Figure 2:
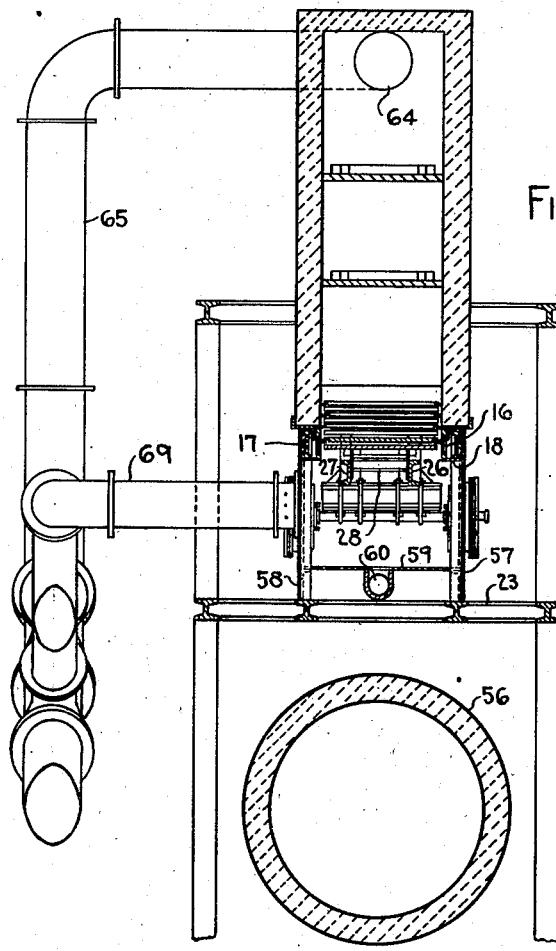
Fig. 2 is a cross-sectional elevation of the device taken on line 2—2 of Fig. 1.
Figure 5:
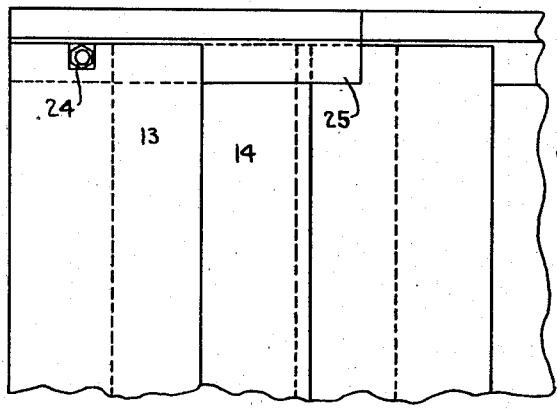
Fig. 5 is a fragmentary plan view of a portion of the grate assembly.

Referring to the drawings and Figure 1 in particular, 1 designates an enclosed cement raw material slurry chamber, which chamber comprises a preliminary drying and concentrating compartment 2 and a final drying and heating compartment 3. Cement raw material either in the form of a free flowing slurry or wet plastic mass is fed to the drying or concentrating compartment 2 from a source of supply not shown by a feeding and measuring device 4 of usual construction. The material at this point may contain various percentages of water ranging from about 18% when previously run through a centrifuge to as high as 50% or more if supplied directly from thickeners and the like. A discharge pipe 5 directs the slurry on to the first and uppermost horizontal plate 6 of the drying compartment 2, two of these plates being shown, but it being obvious that any number of these plates might be used depending upon the length of travel desired. Each plate 6 is made of a heat conducting material secured in the sides and one end wall of the compartment, the opposite end of the plate terminating short of the other end wall to leave an opening 7 through which the material passes to the next lower plate. As shown in Figure 1, alternate plates are attached to opposite end walls thereby forming a tortuous passage. An endless drag chain 8 driven by any suitable variable speed means, such as a "Reeves drive," indicated at 72 travels over the plates, guided by pulleys 9 to advance, agitate and control the movement of the slurry, from the feed pipe 5 to opening 8. The guide pulleys 9 as shown are placed outside the chamber 1 in housings 10 provided to support these pulleys and keep any material adhering to the chain as it passes out of the drying compartment from dropping on the surrounding machinery or floor. It will be obvious from the above description that the time of treatment of the slurry may be varied by either the speed of the drag chain or the number and length of the plates over which the slurry passes so that the moisture content of the material at the last opening 7 where the material is discharged to the next compartment may be that desired with relation to the total quantity of heat available regardless of the moisture content when fed to this compartment. As previously stated the plates 6 are of heat conducting material adapting heated gases passed through the preliminary drying and concentrating compartment to transfer their heat to the material both by conduction through the plates and by surface contact with the material.

The raw material issued from the last opening 7 has had sufficient moisture extracted from it in the drying compartment to lose its fluent characteristics and is received in the heating compartment, where it is further dried and/or heated while upon a grate assembly, in the form of cakes or large particles. The particles are received in the heating compartment 3 upon a shelf 12, and after a sufficient accumulation to form a natural angle of repose, the descending particles are distributed by the accumulation on the shelf and pass downwardly to form a flat bed resting upon the grate assembly 11 now to be described.

Figure 4:
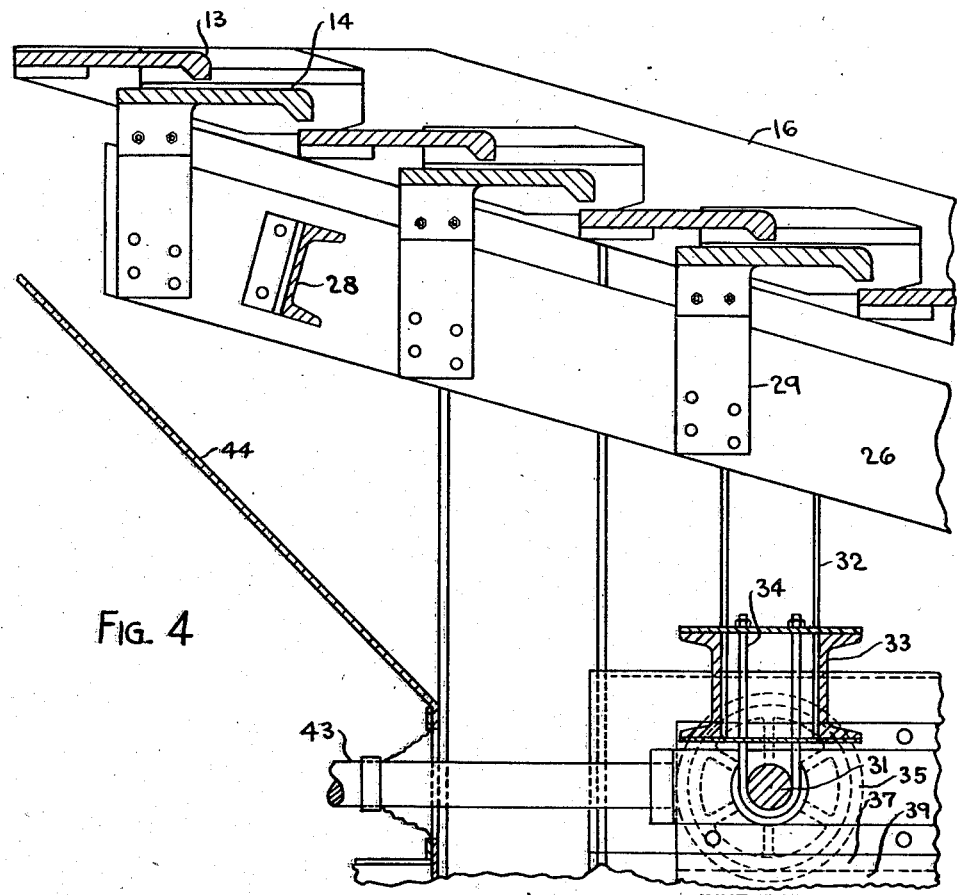
Fig. 4 is a fragmentary elevation partly in section of the upper portion of the grate assembly.

Referring to Figures 1 and 4 in particular it will be seen that the grate assembly comprises fixed grates 13 all of which are rigidly secured to a stationary frame, and movable grates 14 all of which are secured to a moving frame, thus forming separate unitary structures. The stationary frame comprises inclined channel members 16 and 17 secured by brackets 18 to upright supports 19, 20, 21 and 22 which are in turn supported upon a floor structure 23. The fixed grates 13 are bolted as at 24 to angular brackets 25, welded or otherwise secured to the frame members 16 and 17, each bracket extending forwardly beyond the fixed grates to divert the particles from the space between the side edges of the moving grates 14 and the frame members 16 and 17.

Figure 6:
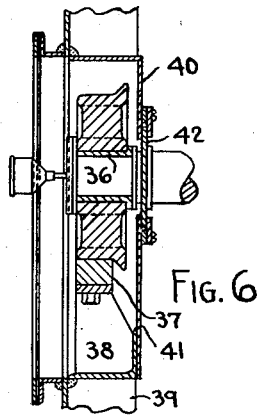
Fig. 6 is a cross-sectional detailed view of one of the supporting wheels.

The moving frame comprises inclined side members 26 and 27 suitably braced as at 28, the side members carrying uprights 29 to which flanges, cast integrally at the side edges of the movable grates 14, are secured. The members 26 and 27 are secured to axles 30 and 31 through vertical supports 32, housing 33 and U-shaped strap 34. The axles 30 and 31 are supported by flanged wheels 35, shown in detail in Figure 6, provided with bronze bushings 36, the wheels turning on the axles and running on rails 37, the rails being bolted to angle members 38 secured to and supported by I-beams 39 carried by the stationary frame. Plate closure means 40 and 41 cooperate with seal 42 carried by the axle to prevent air from being drawn into the space below the grates.

The reciprocating motion of the movable frame may be conveniently accomplished by two spaced eccentrics of the conventional type comprising eccentric rods 43 pivotally connected to axle 31, the rods passing through slots in the rear wall of the end closure plate 44 for the space below the grate assembly and terminating in the usual straps 45 surrounding each eccentric disc 46. A common crankshaft 47 is provided with sprocket 48 driven through a chain 49 by a variable speed motor, with speed reducer, indicated at 50. It will be seen that grates 14 move in a horizontal plane between fixed grates 13 and that the extent of the movement or throw depends upon the eccentricity of discs 46 on the crankshaft 47. In Figure 4, the moving grates are shown to be in their rearmost position and the maximum permissible advance is about one-half their width, at which point the rear edge of each moving grate is covered by the leading edge of the fixed grate above it, thereby avoiding the passage of the material treated between the grates. It will also be understood that the rate of travel of the bed and consequently its thickness can be varied by changing the speed of the motor 50. The fixed and moving grates are essentially similar and may be gray iron castings, the forward or ledge edges of the fixed grates and the side edges of the moving grates preferably being chilled in casting to resist wear of the abrasive character of the cement particles.

The alternate grates are spaced a distance, usually about ¼" to form horizontal air passageways from the upper portion of compartment 3 to the space below the grate assembly. The space below the grate assembly is divided by division wall 51 into exhausting boxes 52 and 53. The forward or discharge end of the heating compartment below the grate assembly is closed by a refractory wall 54 upon which the lowermost fixed grate rests. Wall 54 forms one side of a trough 55 into which the dried and heated cement raw material is discharged, from which trough this material is discharged to the kiln 56 through chute 57. The space below the grate assembly 11 in addition to end walls 44 and 54 is inclosed by side walls 57, 58 and bottom 59, all of which may be of sheet metal with the exception of 54 as the heated gases after passing through the bed of material are comparatively cool. In the floor member 59 is positioned a screw conveyor 60 driven from motor 50 through chain 49, sprockets 48, 61 and chain 62, this conveyor advancing any material which might leak through the grates to the discharge trough 55.

The heated exhaust gases from the kiln are directed to the compartment 3 through passageway 76 formed between the discharge trough 55 and the outer wall of the chamber 1. These gases travel upwardly in surface contact with the bed of material on the grate assembly and pass into the compartment 2. It will be seen from Figure 1 that the gases contact the bottoms of plates 6 in their travel through the compartment 2 as well as make surface contact with the cement raw material. A continuous flow of gases is maintained through the two compartments by a fan 63, driven by a suitable motor 74 through belt 75 connected to outlet 64 in the upper portion of compartment 2 by duct 65. The exhaust side of fan 63 is connected by duct 66 to stack 67 through which the gases are passed to the atmosphere. Branch ducts 68 and 69 connect boxes 52 and 53 to the fan inlet duct 65 whereby the pressures in these boxes may be reduced sufficiently to cause a portion of the heated gases to travel downwardly through the traveling bed of material, the reduction in pressure in these boxes being controlled by louvers 70 and 71. By means of these louvers 70 and 71 it will be seen that the heated gases may be passed through one portion of the bed and not the other or if desired both louvers may be closed so that all of the gases travel along the bed and into the drying compartment from which it is exhausted through duct 65.

The operation of the apparatus will be generally apparent from the foregoing, and it will be understood that cement slurry direct from the thickener or after the slurry from the thickener has been run through a centrifuge so as to reduce the moisture content somewhat is discharged on to the plates of the drying compartment where its flow is controlled and the material is advanced to the discharge end of the compartment, the slurry being converted from a liquid to plastic or semi-dried cakes or particles. The discharge from the drying compartment is formed into a relatively flat, inclined particle bed on the grate surfaces and is moved toward the forward or discharge end of the heating compartment at a regular, intermittent rate. The thickness of the bed, and the rate of travel are controlled by the rate of reciprocation, the discs of the eccentrics usually being driven at very low speed usually from 4 to 8 R. P. M. in an apparatus of the proportions illustrated. The individual particles are subjected to a continuous agitation and rolling movements as they descend from grate to grate, this agitation and rolling movement tending to grade the bed with the larger particles at the top, the entire bed assuming a uniform density. The heated gases may all be passed over the bed in surface contact therewith and thence into the dryer or a selected portion of the gases may be passed through the bed in the direction opposite to the general movement of the bed at selected areas. As the moving grates are advanced and retracted the location of the streams of gases passing through the bed is changed horizontally. During the rearward movement, the leading edges of the fixed grates force the particles to descend to the next lower grate, from which they are forced during forward movement.

Since certain changes in carrying out the above process and in the construction set forth, which embody the invention may be made without departing from its scope, it is intended that all matter contained in the above description as shown in the accompanying drawings shall be interpreted as illustrative and not in a limiting sense.

Reference is hereby made to my copending applications Serial Nos. 327,608 and 327,609, filed concurrently herewith.

I claim:

1. A method of treating wet cement raw material in the production of cement clinker in rotary kilns which comprises feeding the wet cement raw material to an enclosed chamber, advancing the wet cement raw material through confined heat-conducting passageways in one portion of the chamber to partly dry same, delivering the partially dried material to a heating compartment, continuously forming a bed of partially dried material particles on a support inclining downwardly at an angle less than the angle of repose of the material with the material from the passageways entering the upper portion of the bed, applying mechanical pressure to the under portion of the bed to advance the same at a substantially uniform rate under conditions of continuous agitation to grade the material particles in the bed with the largest particles at the top and the smaller particles at the bottom, passing heated gases from the kiln over the material on the bed and in the passageways in surface contact therewith, whereby moisture is removed and the particles raised to a uniformly elevated temperature, and delivering the dried and heated particles to the kiln.

2. A method of conditioning wet cement raw material in the manufacture of cement clinker in rotary kilns which comprises removing sufficient moisture from the wet cement raw material to form self-sustaining partially dried particles, delivering the partially dried particles to the heating compartment, continuously forming and maintaining a bed of material particles of substantially uniform cross-section on a support inclining downwardly at an angle less than the angle of repose of the material, with the material from the passageways entering the upper portion of the bed, advancing the bed of material downwardly along said support in a direction substantially parallel to the support under conditions of continuous agitation to cause relative movement of the particles thereof to grade the particles, with the larger particles at the top of the bed, directing heated gases from the kiln above the bed of material, maintaining a reduced pressure in the upper portion of the compartment to cause the heated gases to flow along the surface of the material in the bed, maintaining a reduced pressure below the bed of material to cause a portion of the heated gases to flow downwardly through the bed, whereby moisture is removed and the particles raised to a uniformly elevated temperature and delivering the dry and heated material to the kiln.

3. A method of treating wet cement raw material in the production of cement clinker in rotary kilns which comprises feeding the wet cement raw material to an enclosed chamber, advancing the wet cement raw material through confined heat-conducting passageways in one portion of the chamber while supplying heat to the upper and lower surfaces to dry the material to self-sustaining cakes or particles delivering the partially dried material to a heating compartment, forming the partially dried material particles as a bed of substantially uniform thickness on a support inclining downwardly at an angle less than the angle of repose of the material, advancing the bed down the support at a substantially uniform rate in an uninterrupted stream under conditions of continuous agitation to cause relative movement of the particles thereof and to grade the particles in their downward movement as to size, with the larger particles at the top and the smaller particles at the bottom, directing heated gases from the kiln above the bed of material, maintaining a reduced pressure in the passageways to cause the heated gases to flow along the surface of the material in the bed and through the passageways, maintaining a reduced pressure below the bed of material to cause a portion of the heated gases to flow downwardly through the bed, whereby the remaining moisture is removed and the particles raised to a uniformly elevated temperature and delivering the dried and heated material to the kiln.

4. A method of treating wet cement raw material in the production of cement clinker in rotary kilns which comprises feeding the wet cement raw material to an enclosed chamber, advancing the wet cement raw material through confined heat-conducting passageways in one portion of the chamber to dry the material to self-sustaining cakes or particles, delivering the partially dried material to a heating compartment, forming and continuously maintaining the material particles as an approximately flat bed of substantially uniform thickness on a support inclined downwardly at an angle less than the angle of repose of the material, advancing said bed of material downwardly over said support in a direction substantially parallel to the support under conditions of continuous agitation to cause relative movement of the particles thereof and to grade the particles as to size, with the larger particles at the top of the bed, passing heated gases from the kiln over the material on the bed and in the passageways in surface contact therewith and simultaneously subjecting the bed to heated gas streams directed horizontally into and through the bed generally in the direction opposite to its movement whereby moisture is removed and the particles are raised to a uniformly elevated temperature, and delivering the dried and heated particles to the kiln.

5. A method of treating wet cement raw material in the production of cement clinker in rotary kilns which comprises feeding the wet cement raw material to an enclosed chamber, advancing the wet cement raw material through confined heat-conducting passageways in one portion of the chamber to dry the material to self-sustaining particles or cakes, delivering the partially dried material to a heating compartment, forming the partially dried particles as an approximately flat bed of substantially uniform thickness on a support inclining downwardly at an angle less than the angle of repose of the material, applying mechanical pressure to the under portion of the bed to advance the same at a substantially uniform rate under conditions of continuous agitation, passing heated gases from the kiln over the material on the bed and in the passageways in surface contact therewith and continuously subjecting the bed to streams of heated kiln gases, successive streams being directed horizontally into and through the bed approximately throughout the width thereof and generally in the direction opposite to its movement whereby the moisture is removed and the particles raised to a uniformly elevated temperature and delivering the dried and heated particles to the kiln.

6. A method of treating wet cement raw material in the production of cement clinker in rotary kilns which comprises feeding the wet cement raw material to an enclosed chamber, advancing the wet cement raw material through confined heat-conducting passageways in one portion of the chamber to remove a portion of the moisture and form self-sustaining particles, delivering the partially dried material to a heating compartment in the chamber on a support inclining downwardly at an angle less than the angle of repose of the material, advancing the bed down the support at a substantially uniform rate in an uninterrupted stream under conditions of continuous agitation to cause relative movement of the particles thereof and to grade the particles in their downward movement as to size, with the larger particles at the top and the smaller particles at the bottom, directing the heated gases from the kiln into the chamber above the bed, passing a portion of the heated gases over the material on the bed and in the passageways in surface contact therewith, the remaining portion of the heated gases flowing downwardly through the bed in a plurality of gas streams and delivering the dried and heated particles to the kiln.

7. A method of treating wet cement raw material in the production of cement clinker in rotary kilns which comprises feeding the raw material to an enclosed chamber, advancing the material through confined heat-conducting passageways in one portion of the chamber to dry the material partially and form self-sustaining cakes or particles, delivering the partially dried particles to the heating compartment, forming the particles as an approximately flat bed of substantially uniform thickness on a support inclining downwardly at an angle less than the angle of repose of the material, advancing the bed down the support at a substantially uniform rate in an uninterrupted stream under conditions of continuous agitation to cause relative movement of the particles thereof and to grade the particles in their downward movement as to size, with the larger particles at the top and the smaller particles at the bottom, continuously subjecting the bed to streams of waste gases from the kiln at successive levels directed horizontally into the bed approximately throughout its width and generally in the direction opposite to its movement, continuously changing the horizontal location of the gas streams at alternate levels, passing additional waste gases from the kiln over the material on the bed and in the passageways in surface contact therewith whereby the moisture is removed and the particles are raised to a uniformly elevated temperature and delivering the dried and heated particles to the kiln.

8. A method of drying and preheating wet cement raw material with heated gases from a rotary kiln which comprises feeding the wet cement raw material to an enclosed chamber, advancing the wet cement raw material over heat-conducting surfaces forming passageways in the upper portion of the chamber, subjecting the surface of the material and the heat-conducting surfaces to a source of heat whereby the slurry is partially dried and converted from a liquid to self-sustaining particles, delivering the partially dried particles to a heating compartment continuously forming a bed of partially dried material particles on a support inclining downwardly at an angle less than the angle of repose of the material, applying mechanical pressure to the under portion of the bed to advance the same at a uniform rate under conditions of continuous agitation to grade the material particles, with the larger particles at the top and the smaller particles at the bottom, directing heated gases from the kiln above the bed of material, maintaining a reduced pressure in the passageways to cause the heated gases to flow along the surface of the material in the bed and through the passageways, maintaining a reduced pressure below the bed of material to cause a portion of the heated gases to flow downwardly through the bed, whereby the remaining moisture is removed and the particles raised to a uniformly elevated temperature and delivering the dried and heated material to the kiln.

9. A method of drying and preheating cement raw material slurry with heated waste gases from the rotary kiln in which the material is to be burned which comprises removing sufficient moisture from the raw material slurry to form self-sustaining particles, forming and continuously maintaining a bed of material of substantially uniform cross-section on a support inclined downwardly at an angle less than the angle of repose of the material, advancing said bed of material downwardly over said support in a direction substantially parallel to the support, under conditions of continuous agitation to cause relative movement of the particles thereof and to grade the particles as to size, with the larger particles at the top of the bed, directing heated gases from the kiln along the surface of the bed of material, maintaining a reduced pressure below the bed to cause a portion of the heated kiln gases to flow downwardly through the bed whereby the remaining moisture is removed and the particles are raised to a uniform temperature.

10. A method of drying and preheating cement raw material slurry with heated waste gases from the rotary kiln in which the material is to be burned which comprises removing sufficient moisture from the raw material slurry to form self-sustaining particles, continuously forming a bed of partially dried material particles on a support inclining downwardly at an angle less than the angle of repose of the material, applying mechanical pressure to the under portion of the bed to advance the same at a uniform rate under conditions of continuous agitation to grade the material particles, with the larger particles at the top and the smaller particles at the bottom, directing heated gases from the kiln along the surface of the material and in contact therewith whereby the remaining moisture is removed and the particles raised to a uniform temperature.

11. In a method for the preliminary heat treatment of wet cement raw materials with the hot exit gases from the rotary kiln in which they are to be burned, the improvement which comprises feeding the material at a substantially uniform rate to one end of an elongated enclosed passageway, continuously agitating and conveying the materials in a substantially horizontal plane through the passageway in the presence of flowing hot gases to heat the materials from the upper and lower surfaces, and at a rate at least slow enough to permit drying of the materials to a substantially non-fluent condition, discharging the materials from the other end of the passageway into a second compartment on a support inclining downwardly at an angle less than the angle of repose of the material, advancing the bed down the support at a substantially uniform rate in an uninterrupted stream under conditions of continuous agitation to cause relative movement of the particles thereof and to grade the particles in their downward movement as to size, with the larger particles at the top and the smaller particles at the bottom, directing heated gases from the kiln above the bed of material, maintaining a reduced pressure in the passageways to cause the heated gases to flow along the surface of the material in the bed and through the passageways, maintaining a reduced pressure below the bed of material to cause a portion of the heated gases to flow downwardly through the bed, whereby the remaining moisture is removed and the particles raised to a uniformly elevated temperature and delivering the dried and heated material to the kiln.

12. In a method of treating wet cement raw material in the production of cement clinker in a rotary kiln which comprises advancing the wet material over evaporating pans, subjecting the exposed surfaces of the material and evaporating pans to heated gases to partially dry the material to self-sustaining particles, continuously forming a bed of partially dried material particles on a support inclining downwardly at an angle less than the angle of repose of the material, advancing the bed downwardly along the support in an uninterrupted stream under conditions of continuous agitation, directing heated gases from the kiln along the surface of the bed, maintaining a differential of pressure below the bed to cause a portion of the heated kiln gases to pass through the bed whereby the remaining moisture is removed and the particles constituting the bed brought to a uniform temperature and delivering the dried and heated particles to the kiln.

ALFRED E. DOUGLASS.